Patented June 11, 1935

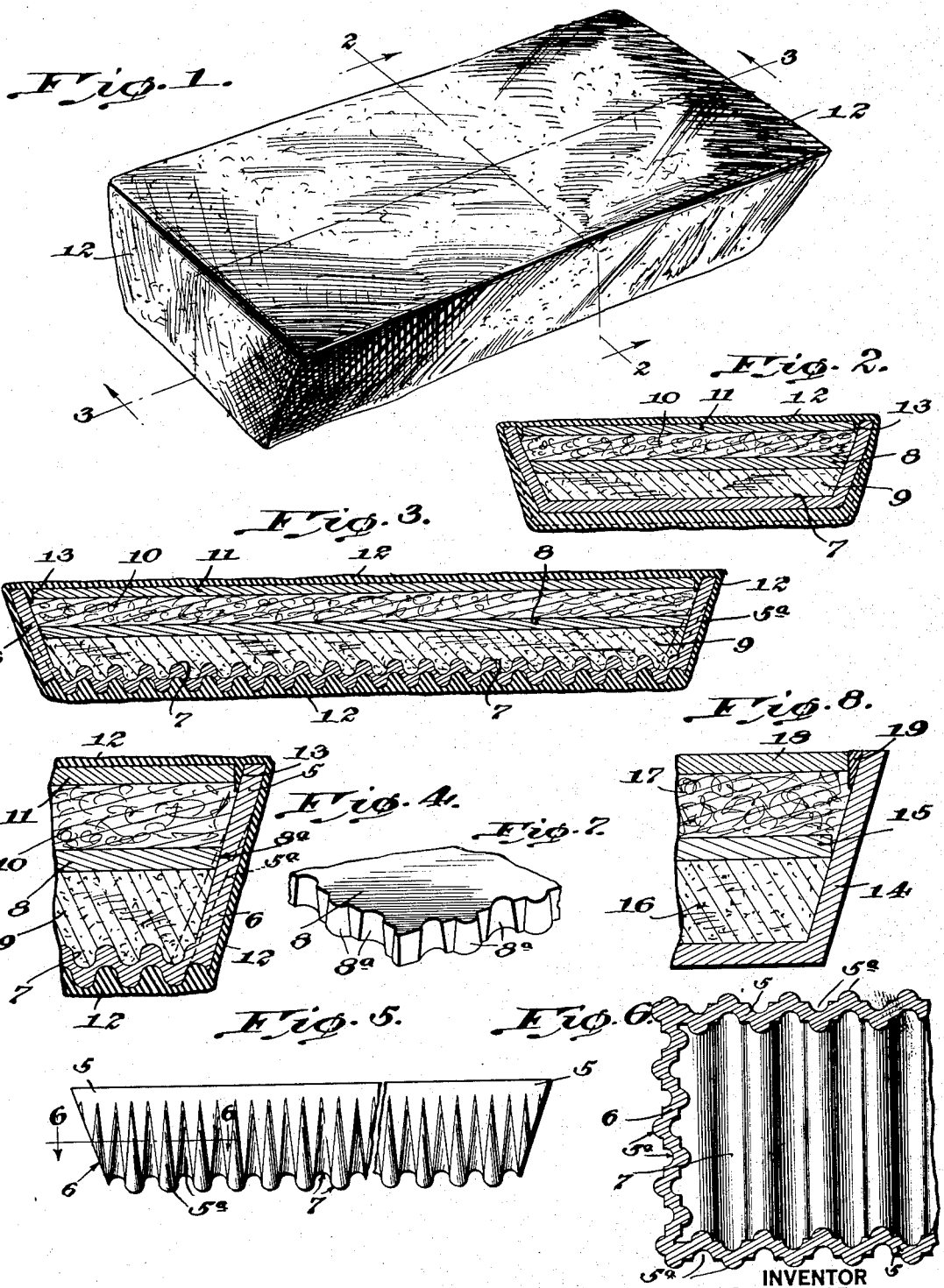

2,004,863

UNITED STATES PATENT OFFICE 2,004,863

CONFECTION

Harvey C. Gibson, Columbia, Pa.

Application June 12, 1933, Serial No. 675,472

2 Claims. (Cl. 99—16)

This invention relates to confection and more particularly to a substantially solid edible body consisting of a series of laminations of edible material so held in place that the same may be conveniently eaten.

Briefly stated an important object of this invention is to provide a confection in which the chief ingredients are ice cream, congealed custard or other suitable normally liquid materials, and a crushed or preserved fruit or other suitable confection maintained in spaced relation and in such a manner that the same will not readily leak from the confection either before or during eating.

A further object is to provide a confection wherein the main top layer or cover is sealed through the medium of a continuous wedge-shaped bead of suitable edible material.

Also one of the principal aims of the invention is to provide a confection of the class described which is cheap to manufacture, easy to handle in trade and highly palatable.

Other objects and advantages will be apparent during the course of the following description.

In the accompanying drawing, forming a part of this application, and in which like numerals are employed to designate like parts throughout the same, Figure 1 is a perspective view of the confection, Figure 2 is a transverse section taken on the line 2—2 of Figure 1.

Figure 3 is a longitudinal section taken on the line 3—3 of Figure 1.

Figure 4 is a detail sectional view illustrating the means for securing the main cover or closure in position.

Figure 5 is a side view of the container.

Figure 6 is an enlarged section taken on the line 6—6 of Figure 5.

Figure 7 is a perspective view of a portion of a wafer which forms a partition, and Figure 8 is a sectional view similar to Figure 4 of a modified form of the device.

In carrying out my invention I make use of a container. This container consists of side walls 5, end walls 6 and a bottom 7. The container is of light wafer-like edible material and may be of any flavor desired. The bottom 7 is corrugated as clearly shown in Figures 3 and 6. The side and end walls are flared outwardly and have corrugations 5ª extending upwardly. These are cuspidated as clearly shown in Figure 5 and they terminate short of the upper end of the container to leave a smooth portion, the purpose of which will be explained later. In Figure 7 I have shown a wafer 8 of edible composition and this wafer is corrugated on its sides and ends with corrugations 8ª that tend to conform with the corrugations 5ª of the side and end walls of the container when the wafer is in the predetermined position.

In making the confection a quantity of ice cream or other suitable confection material 9 is disposed at the bottom of the container and the wafer 8 is placed in position above the ice cream. Preserved fruit or similar material 10 is now placed on the wafer which, as stated, has corrugations which fit those of the walls of the container. Since the corrugations on the walls and on the wafer are tapered there will be a point where the wafer will tightly fit the walls which, as it will be observed, are flared outwardly, and the corrugations in the wafer will make a snug fit with those on the walls so that the wafer is held securely and cannot be twisted out of position by ordinary handling.

The fruit or other confection 10 has above it an edible wafer 11 which substantially fills the interior of the container and forms a cover. An edible coating 12 of any suitable material, such as chocolate, is applied to the entire outer surface of the container and the cover 11. As will be seen from Figures 3 and 4 the wafer 11 is cut off squarely and this leaves a space between the edges of the wafer and the wall of the container into which the coating 12 runs to form a seal 13.

The confection has several advantages over others of its type. The provision of the partitional wafer 8 prevents the spilling of the ice cream 9 in the event that the latter should become soft, or where some semi-liquid material is used in lieu of ice cream. The wafer 8 also forms a strengthening member which in connection with the corrugated construction of the container results in a confection which will withstand transportation and handling without leaking or crushing.

The water adjusts itself automatically to the desired position and a snug fit is assured between the two interlocking surfaces, that is, of the wafer and of the walls of the container.

In Figure 8 I have shown a modified form in which the confection may be used without the extra coating and without the corrugated container or wafer. In this instance the body portion of the container 14 is of edible material and the wafer 15 forms a strengthening means and also a partition for dividing the ice cream 16 or other suitable material from the preserved fruit 17 or other edible material. The wafer 18 forms a top portion which may be sealed at its edges with an edible sealing material 19. In this form of the device, however, the wafer is not held as rigidly as in the preferred form shown in Figures 1 to 7 and is more apt to turn. However, with some edible materials, such as ice cream, which has been frozen hard and semi-plastic material, such as preserved fruit, this form will serve for some purposes.

In the preferred form of the device it will be noted, as stated above, that the corrugations terminate short of the top. This provides a smooth surface for the sealing of the top wafer whereby the free flowing of the sealing bead 13 is not interfered with which the uneven surface created by the corrugation might cause.

I claim:—

1. A confection comprising an elongated edible container, the bottom and side walls of said container being corrugated, the corrugations on the side walls being cuspidated and terminating short of the upper edge of the container, an edible wafer serving as a partition and disposed parallel to the bottom, the ends and sides of said partition being in frictional engagement with the walls of the container, edible fillings above and below said wafer, a second wafer forming a top, means for sealing said second named wafer in position, and an edible coating on the outside of the container and the top wafer.

2. A confection comprising an elongated edible container, the walls of said container having cuspidated corrugations extending from the bottom toward the top and terminating short of the top, a filling of edible material disposed in the bottom of the container, an edible wafer having corrugated edges conforming with those of the cuspidated corrugations of the container and interlocking with the last named corrugations for preventing lateral movement and for holding said wafer at a predetermined height above the bottom, a second filling on said wafer, a second wafer above said second filling, and an edible coating over the exterior of the container and the second wafer and having a portion extending between the walls of the container and the second named wafer for sealing the confection.

HARVEY C. GIBSON.